(12) United States Patent
Singh et al.

(10) Patent No.: US 12,112,265 B2
(45) Date of Patent: Oct. 8, 2024

(54) ARCHITECTURE FOR RUNNING CONVOLUTIONAL NETWORKS ON MEMORY AND MIPS CONSTRAINED EMBEDDED DEVICES

(71) Applicant: Analog Devices International Unlimited Company, Limerick (IE)

(72) Inventors: Raka Singh, Bangalore (IN); Neeraj Pai, Bangalore (IN); Swastik Mahapatra, Bhubaneshwar (IN); Anil M Sripadarao, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 964 days.

(21) Appl. No.: 17/127,560

(22) Filed: Dec. 18, 2020

(65) Prior Publication Data

US 2022/0198257 A1    Jun. 23, 2022

(51) Int. Cl.
*G06N 3/08* (2023.01)
*G06F 7/483* (2006.01)
*G06F 12/0802* (2016.01)
*G06N 3/02* (2006.01)

(52) U.S. Cl.
CPC ............. *G06N 3/08* (2013.01); *G06F 7/483* (2013.01); *G06F 12/0802* (2013.01); *G06N 3/02* (2013.01); *G06F 2212/60* (2013.01)

(58) Field of Classification Search
CPC ............ G06N 3/08; G06N 3/02; G06N 3/045; G06N 3/063; G06F 7/483; G06F 12/0802; G06F 12/0875; G06F 2212/60; G06F 2212/1016; G06F 2212/454
See application file for complete search history.

(56) References Cited

U.S. PATENT DOCUMENTS

| | | |
|---|---|---|
| 9,613,001 B2 | 4/2017 | Herrero Abellanas et al. |
| 10,664,310 B2 | 5/2020 | Bokhari et al. |
| 2016/0026912 A1 | 1/2016 | Falcon et al. |

(Continued)

FOREIGN PATENT DOCUMENTS

| | | |
|---|---|---|
| CN | 107688855 A | 2/2018 |
| CN | 110413255 A | 11/2019 |

(Continued)

OTHER PUBLICATIONS

Hailesellasie, "MulNet: A Flexible CNN Processor With Higher Resource Utilization Efficiency for Constrained Devices", IEEE Access, 2019. (Year: 2019).*

(Continued)

*Primary Examiner* — Dave Misir
(74) *Attorney, Agent, or Firm* — Schwegman Lundberg & Woessner, P.A.

(57) ABSTRACT

This disclosure describes techniques to perform convolutional neural networks (CNNs) on embedded devices. The techniques include operations comprising: accessing DNN information including definition of layers and weights of the DNN; obtaining cache or memory information for one or more cache or memory levels of the resource constrained embedded device; and configuring the DNN to be loaded onto the one or more cache or memory levels of the resource constrained embedded device based on the cache or memory information and the DNN information.

18 Claims, 7 Drawing Sheets

(56) References Cited

U.S. PATENT DOCUMENTS

| | | | |
|---|---|---|---|
| 2016/0179434 A1* | 6/2016 | Herrero Abellanas | ..................... G06F 3/0604 711/155 |
| 2017/0286830 A1 | 10/2017 | El-yaniv et al. | |
| 2018/0189642 A1 | 7/2018 | Boesch et al. | |
| 2019/0042948 A1* | 2/2019 | Lee | ........................ G06N 3/063 |
| 2019/0122094 A1* | 4/2019 | Chen | ........................ G06N 3/02 |
| 2019/0122100 A1 | 4/2019 | Kang et al. | |
| 2019/0205736 A1* | 7/2019 | Bleiweiss | ............. G06F 9/3887 |
| 2019/0278707 A1* | 9/2019 | Li | ........................ G06F 12/0646 |
| 2019/0279072 A1 | 9/2019 | Gao et al. | |
| 2019/0340489 A1 | 11/2019 | Mills | |
| 2020/0082264 A1 | 3/2020 | Guo et al. | |
| 2020/0097816 A1 | 3/2020 | Wu et al. | |
| 2020/0126178 A1 | 4/2020 | Munteanu et al. | |
| 2020/0134461 A1* | 4/2020 | Chai | ........................ G06N 3/084 |
| 2020/0257986 A1* | 8/2020 | Diamantopoulos | .... G06N 3/063 |
| 2021/0073112 A1* | 3/2021 | Shi | ........................ G06F 11/3684 |

FOREIGN PATENT DOCUMENTS

| | | |
|---|---|---|
| CN | 110929838 A | 3/2020 |
| CN | 111104120 A | 5/2020 |
| JP | 2018010618 A | 1/2018 |
| WO | WO-2019168084 A1 | 9/2019 |
| WO | WO-2019213070 A1 | 11/2019 |
| WO | WO-2020135602 A1 | 7/2020 |

OTHER PUBLICATIONS

Véstias, "A Survey of Convolutional Neural Networks on Edge with Reconfigurable Computing", Algorithms, 2019. (Year: 2019).*

Chen, Qinyu, et al., "An Efficient Streaming Accelerator for Low Bit-Width Convolutional Neural Networks", Electronics, 8(4), (2019), 22 pgs.

Hailesellasie, Muluken, et al., "MulNet: A Flexible CNN Processor with Higher Resource Utilization Efficiency for Constrained Devices", IEEE Access, 4, (2016), 16 pgs.

* cited by examiner

```
                                    ┌─ 400
```

410 ACCESS DNN INFORMATION INCLUDING DEFINITION OF LAYERS AND WEIGHTS OF THE DNN

420 OBTAIN CACHE OR MEMORY INFORMATION FOR ONE OR MORE CACHE OR MEMORY LEVELS OF THE RESOURCE CONSTRAINED EMBEDDED DEVICE

430 CONFIGURE THE DNN TO BE LOADED ONTO THE ONE OR MORE CACHE OR MEMORY LEVELS OF THE RESOURCE CONSTRAINED EMBEDDED DEVICE BASED ON THE CACHE OR MEMORY INFORMATION AND THE DNN INFORMATION

440 SELECT, BASED ON THE CACHE OR MEMORY INFORMATION, BETWEEN A PLURALITY OF DNN PROCESSING SCHEMES FOR LOADING THE DNN INFORMATION AND DATA ONTO THE RESOURCE CONSTRAINED EMBEDDED DEVICE, WHEREIN A FIRST OF THE PLURALITY OF DNN PROCESSING SCHEMES CAUSES A PORTION OF ONE OF THE LAYERS INTERLEAVED WITH THE WEIGHTS AND DATA TO BE LOADED ONTO A SINGLE CACHE OR MEMORY LEVEL OF THE ONE OR MORE CACHE OR MEMORY LEVELS, AND WHEREIN A SECOND OF THE PLURALITY OF DNN PROCESSING SCHEMES CAUSES A COMPLETE CHANNEL CORRESPONDING TO THE LAYERS AND THE WEIGHTS AND DATA TO BE LOADED ONTO THE SINGLE CACHE OR MEMORY LEVEL

450 SELECT, BASED ON THE LAYERS OF THE DNN, A CONVOLUTION ENGINE FROM A PLURALITY OF CONVOLUTION ENGINES

*FIG. 4*

ARCHITECTURE FOR RUNNING CONVOLUTIONAL NETWORKS ON MEMORY AND MIPS CONSTRAINED EMBEDDED DEVICES

FIELD OF THE DISCLOSURE

This document pertains generally, but not by way of limitation, to executing convolutional neural networks (CNNs) on embedded devices.

BACKGROUND

A convolutional neural network (CNN) is a class of neural network that is applied for applications on images or videos. The basic block of a CNN is called a convolutional block. The weights or configurable parameters for this block, like all other neural network blocks, are tuned during a process of learning called back propagation. Neural networks usually have many layers. These layers are stacked and such an architecture or arrangement of layers with a large number of layers is called a 'deep' network. Such layers are responsible for the effectiveness of convolutional networks in many applications.

SUMMARY

In some aspects, a method is provided for configuring a deep neural network (DNN) to run on a resource constrained embedded device that includes: accessing DNN information including definition of layers and weights of the DNN; obtaining cache or memory information for one or more cache or memory levels of the resource constrained embedded device; configuring the DNN to be loaded onto the one or more cache or memory levels of the resource constrained embedded device based on the cache or memory information and the DNN information; selecting, based on the cache or memory information, between a plurality of DNN processing schemes for loading the DNN information and data onto the resource constrained embedded device, wherein a first of the plurality of DNN processing schemes causes a sub-portion of one of the layers interleaved with the weights and data to be loaded onto a single cache or memory level of the one or more cache or memory levels, and wherein a second of the plurality of DNN processing schemes causes a complete channel corresponding to the layers and the weights and data to be loaded onto the single cache or memory level; and selecting, based on the layers of the DNN, a convolution technique from a plurality of convolution techniques.

In some aspects, the weights of the DNN are floating point weights, further comprising converting the floating point weights to variable length quantized fixed point weights based on a processing capability of the resource constrained embedded device.

In some aspects, the method includes computing a statistical metric of a range of the floating point weights; and determining a quantization factor for converting the floating point weights to the variable quantized fixed point weights based on the statistical metric.

In some aspects, the method includes identifying a floating point weight that includes a fractional component and integer component; and dividing the identified floating point weight by an integer to remove the integer component to improve rounding operations.

In some aspects, the method includes generating a configuration file that merges a layer and model graph structure of the DNN and the weights per each of the layers of the DNN; and encrypting the configuration file.

In some aspects, accessing the DNN information comprises obtaining the configuration file and decrypting the configuration file.

In some aspects, the cache information comprises size information of a level 1 cache and level 2 cache of the resource constrained embedded device, and the memory information comprises a level 3 cache associated with the resource constrained embedded device.

In some aspects, the method includes computing a first size corresponding to a first subset of rows and columns of the data across all of the layers; and in response to determining that the first size fits within a level 1 cache of the resource constrained embedded device, selecting the first of the plurality of DNN processing schemes to process the first subset of the rows and columns across all of the layers.

In some aspects, the method includes causing a second subset of rows and columns of the data across all of the layers to be read into the level 1 cache while the first subset is being processed; and processing the second subset of the rows and columns based on an output of processing the first subset of the rows and columns.

In some aspects, the first and second subsets of the rows are stored in a circular buffer.

In some aspects, the method includes, in response to determining that the first size exceeds a size of the level 1 cache, computing a second size corresponding to an entire row for a subset of columns of the data across a first layer of the layers; and in response to determining that the second size fits within a level 1 cache of the resource constrained embedded device, selecting the second of the plurality of DNN processing schemes.

In some aspects, the method includes storing in the level 1 cache an intermediate output of processing the entire row for the subset of columns of the data across the first layer of the layers; and causing the entire row for the subset of columns of the data across a second layer of the layers to be combined with the intermediate output.

In some aspects, a system for configuring a DNN to run on a resource constrained embedded device includes: a processor configured to perform operations comprising: accessing DNN information including definition of layers and weights of the DNN; obtaining cache or memory information for one or more cache or memory levels of the resource constrained embedded device; configuring the DNN to be loaded onto the one or more cache or memory levels of the resource constrained embedded device based on the cache or memory information and the DNN information; selecting, based on the cache or memory information, between a plurality of DNN processing schemes for loading the DNN information and data onto the resource constrained embedded device, wherein a first of the plurality of DNN processing schemes causes a sub-portion (less than all) of one of the layers interleaved with the weights and data to be loaded onto a single cache or memory level of the one or more cache or memory levels, and wherein a second of the plurality of DNN processing schemes causes a complete channel corresponding to the layers and the weights and data to be loaded onto the single cache or memory level; and selecting, based on the layers of the DNN, a convolution technique from a plurality of convolution techniques.

In some aspects, the weights of the DNN are floating point weights, further comprising converting the floating point weights to quantized fixed point weights based on a processing capability of the resource constrained embedded device.

In some aspects, the operations further comprise computing a statistical metric of a range of the floating point weights; and determining a quantization factor for converting the floating point weights to the quantized fixed point weights based on the statistical metric.

In some aspects, the operations further comprise identifying a floating point weight that includes a fractional component and integer component; and dividing the identified floating point weight by an integer to remove the integer component to improve rounding operations.

In some aspects, a non-transitory computer readable medium storing non-transitory computer readable instructions to configure one or more processors to perform operations for configuring a DNN to run on a resource constrained embedded device includes: accessing DNN information including definition of layers and weights of the DNN; obtaining cache or memory information for one or more cache or memory levels of the resource constrained embedded device; configuring the DNN to be loaded onto the one or more cache or memory levels of the resource constrained embedded device based on the cache or memory information and the DNN information; selecting, based on the cache or memory information, between a plurality of DNN processing schemes for loading the DNN information and data onto the resource constrained embedded device, wherein a first of the plurality of DNN processing schemes causes a sub-portion of one of the layers interleaved with the weights and data to be loaded onto a single cache or memory level of the one or more cache or memory levels, and wherein a second of the plurality of DNN processing schemes causes a complete channel corresponding to the layers and the weights and data to be loaded onto the single cache or memory level; and selecting, based on the layers of the DNN, a convolution technique from a plurality of convolution techniques.

In some aspects, the weights of the DNN are floating point weights, further comprising converting the floating point weights to quantized fixed point weights based on a processing capability of the resource constrained embedded device.

In some aspects, the operations further comprise: computing a statistical metric of a range of the floating point weights; and determining a quantization factor for converting the floating point weights to the quantized fixed point weights based on the statistical metric.

In some aspects, the operations further comprise: identifying a floating point weight that includes a fractional component and integer component; and dividing the identified floating point weight by an integer to remove the integer component to improve rounding operations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 is a flow diagram depicting example process for performing CNNs on embedded devices, in accordance with various embodiments.

DETAILED DESCRIPTION

Figure 1:
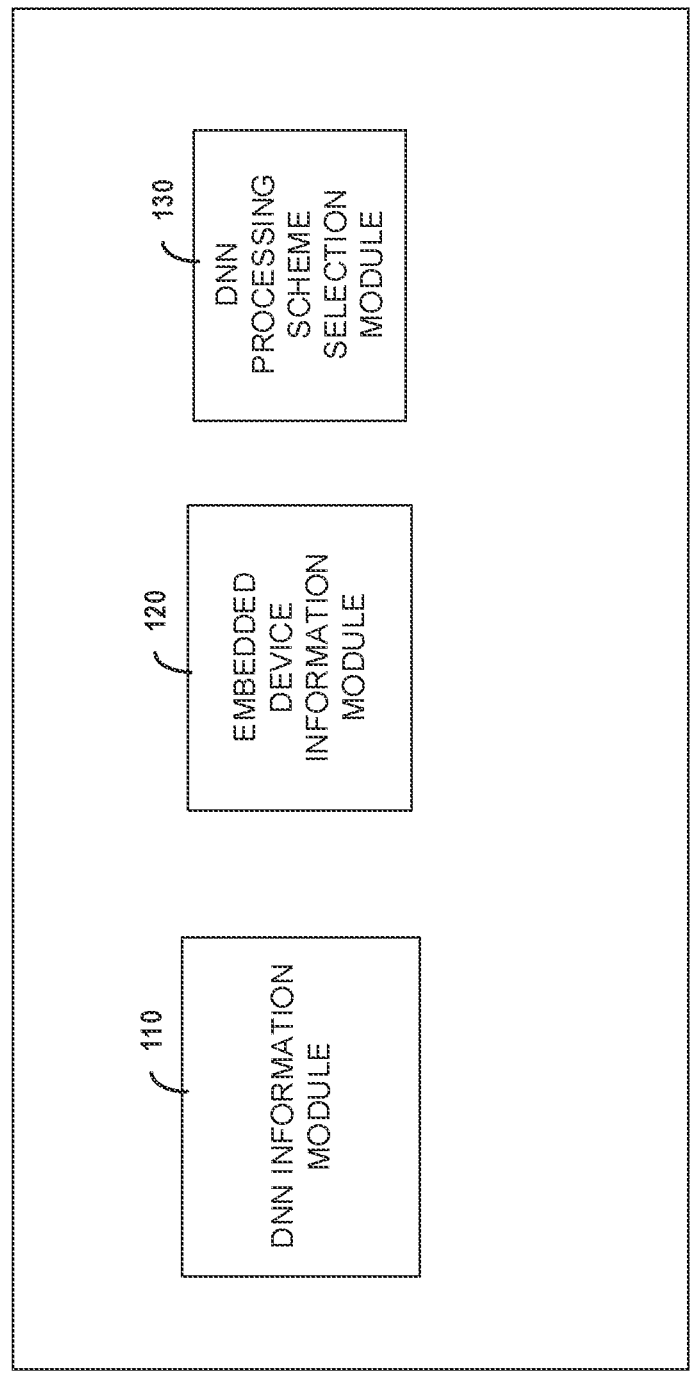
FIG. 1 is a block diagram of a system for performing CNNs on embedded devices, in accordance with various embodiments.

This disclosure describes, among other things, techniques to perform CNNs on embedded devices to enable fast and efficient pre-processing of images, received from an overhead camera (such as a fisheye lens) for detecting objects (such as humans), on embedded devices, and for enabling fast and efficient post-processing detection and tracking of the detected objects on the embedded devices.

Neural networks usually have many layers, typically one or more input layers, one or more output layers, and intermediate layers (called hidden layers). These layers are stacked; namely the output of one layer is input to the next layer. This architecture or arrangement of layers with a large number of layers is called a 'deep' network. Some of the popular deep neural networks include ResNet (which includes 152 layers), VGGNet (which includes 34 layers), and Googlenet (which includes 27 layers). These hidden layers are responsible for the effectiveness of convolutional networks in many applications.

Typically, each layer includes three dimensions: two spatial dimensions (e.g., height and width) and one dimension representing the number of channels. For example, a color input image of size 640×480 (VGA size) can be received. Since this is a color image, the image is represented as three channels of Red, Blue, and Green, and the dimensions for this image can be represented as 640×480×3. A greyscale image may have only one channel and consequently, a VGA image of the same size has dimensions 640×480×1.

Typically, deep networks have a large number of channels, which helps with the performance and improves the effectiveness. If there exist 12 filters for convolution in layer n−1, that means the next layer n will have 12 channels. Usually the number of filter channels or depth grows by an order of two across layers. The result is an increase in the filter depth and, correspondingly, the memory requirements. In an example, an input layer may be of size 220 pixels×220 pixels×512 channels. For a single 3×3 convolution operation, the operator is needed that is of dimension 3×3×512 for a single filter. For a complete filtering, there will be a total of 220×220×3×3×512 multiplications for one filter. If there exist 1024 filters for this layer, the total operations will be ~220×220×3×3×512*2014~449 million multiply and accumulate operations (MACs) for one layer alone.

Such a complexity makes it difficult to implement and inefficient to operate and run deep convolutional networks on typical embedded devices. This is because the embedded devices are typically constrained in terms of memory as well as processing power, which limits their ability to quickly and efficiently process large convolution operations.

The disclosed embodiments provide a mechanism to quickly and efficiently operate and run CNNs on embedded devices. Specifically, disclosed is an optimized software architecture that has the following components: 1) a tool to convert floating point weights to quantized fixed point weights; 2) a parser tool to generate a binary configuration file; and 3) a framework that determines how to efficiently perform forward pass operations by optimizing memory use and schemes.

In some embodiments, a tool to convert floating point weights to quantized fixed point weights is provided. DNNs usually run with floating point precision to maintain higher accuracy, which makes it a challenge to run on fixed point embedded processors. Usually, fixed point Multiply and Accumulate operations are supported in hardware with a minimal overhead but this is not the case for floating point precision. Hence, to run these networks on a fixed point processor, all the operations are converted to fixed point by converting the weights to fixed point without significantly or adversely impacting the accuracy.

According to the disclosed embodiments, the tool performs a statistical analysis of the range of weights per each layer and determines the ideal or optimal quantization factor that preserves the most precision in 8 bit or 16 bit fixed point. To make rounding optimal, the desired weight quantized format is 0.15 or Q 0.15 (e.g., no integer bit, 1 bit for sign, and 15 bits for the fractional part). This choice is governed by the fact that, in some embedded devices, as the system directly stores from the accumulator register to a register, the number is automatically shifted by 16 bits. As such, having the weight format at Q.15 avoids shift operations after convolution and keeps the input and output to a convolution layer in the same Q format after convolution.

If the spread of the values of the weights allows to select this particular Q format, a division factor is added to modify the existing weights to make the quantized format 0.15. For example, if the actual maximum weight is −3.9 and such a weight needs to be represented in the 0.15 format, the weight is divided by four to make it fully fractional (e.g., −3.9/4=−0.975). Then the weight can be represented using only fractional bits. Making this fully fractional makes the rounding operation more efficient on embedded processors or devices. The correction factor can be multiplied to the MAC output (e.g., four times) in this case, since this will be common across elements. The disclosed tool captures the ideal or optimized quantization format per layer and stores this for use in the configuration file.

In some embodiments, a parser tool to generate a binary configuration file is provided. The software framework is generalized with support for building blocks like convolution and pooling, among others. The structure of the network is usually captured in the architecture or model of the network, which is like a graph that defines the interconnections as well as the layers and type of layers (e.g., Layer 0 is convolution, Layer 1 is Pooling) and the trained weights that give the best results. The trained weights are the ideal set of parameters that are obtained after training using the training data (e.g., training images) to give the best performance. The disclosed parser tool receives the architecture and the weights as inputs and combines them in a defined format that can be easily read by the software framework. The output of the parser tool is a binary file that merges the layer/model graph structure and the weights per layer. The advantage of using a binary format includes the ability to encrypt the binary file using any of the known encryption schemes; maintain data integrity using cyclic redundancy codes (CRC) and other protection schemes; directly read the buffer and assign to an internal buffer without any need for parsing this data. The weights can be assigned to an internal buffer without any parsing in the framework.

In some embodiments, a framework that determines how to efficiently perform forward pass operations by optimizing memory use and schemes is provided. An embedded processor is usually constrained in two aspects: memory and processing capabilities. The disclosed techniques resolve the processing limitations by converting the models to fixed point near equivalents. Ensuring that that the memory (and specifically the memory hierarchy) is efficiently used is also addressed by the disclosed embodiments.

There are many types of memories and memory hierarchies on the embedded devices or processors: L1 (level 1 cache), which is on chip memory and gives the fastest read/write access of typically 1 cycle; L2 (level 2 cache), which is also on chip but usually slower to access; and L3 (level 3 cache), this is the off chip memory, which is much slower to read/write. Specifically, in computer architecture, the memory hierarchy separates computer storage into a hierarchy based on response time. Since response time, complexity, and capacity are related, the levels of the hierarchy may also be distinguished by their performance and controlling technologies. Memory hierarchy affects performance in computer architectural design, algorithm predictions, and lower level programming constructs involving locality of reference.

Designing for high performance requires considering the restrictions of the memory hierarchy, i.e. the size and capabilities of each component. Each of the various components can be viewed as part of a hierarchy of memories (m1, m2, . . . , mn) in which each member mi is typically smaller and faster than the next highest member mi+1 of the hierarchy. To limit waiting by higher levels, a lower level will respond by filling a buffer and then signaling for activating the transfer. Some levels of the hierarchy of the memory are implemented and form part of the embedded device or processor while others are outside of the embedded device or processor. As referred to herein, "levels" of memory and the memory hierarchy include any one or combination of processor registers, Level 0 (L0) Micro operations cache (e.g., 6 KiB in size), Level 1 (L1) Instruction cache (e.g., 128 KiB in size), Level 1 (L1) Data cache (e.g., 128 KiB in size), Level 2 (L2) Instruction and data (shared) (e.g., 1 MiB in size), Level 3 (L3) Shared cache (e.g., 6 MiB in size), Level 4 (L4) Shared cache (e.g., 128 MiB in size), Main memory (Primary storage)(e.g., gigabytes in size), Disk storage (Secondary storage) (e.g., Terabytes in size).

For CNNs used for image processing, the common operation is the convolution operation. This operation involves a multiplication in three dimensions (width, height and depth). Common deep learning frameworks like Tensorflow optimize this by converting this three-dimensional (3D) multiplication to a two-dimensional (2D) multiplication operation. To perform 2D multiplication for a 3D image, the 3D array needs to be converted to a 2D array, which can be performed according to an operation referred to as im2row (e.g., convert from a block of a 3D image to a row of a matrix). Usually there is some overlap in the elements between two successive convolution operations, and im2row replicates the elements regardless of any overlap, which wastes memory.

The disclosed embodiments provide three different DNN processing schemes to handle this data (e.g., 3D image data). An interleaved scheme is one in which the weights are stored in an interleaved manner. For example, for an RGB image, the values are stored as R0, G0, B0, R1, G1, B1 . . . R640, G640, B640 (where R0 represents the red pixel value at the 0 position, R1 represents the red pixel value at the 1 position, and so forth; where G0 represents the green pixel value at the 0 position, G1 represents the green pixel value at the 1 position, and so forth; and where B0 represents the blue pixel value at the 0 position, B1 represents the blue pixel value at the 1 position, and so forth).

This allows the resource constrained devices to perform a 2D direct memory access (DMA) instead of a 3D DMA. Specifically, for a 3×3×3 convolution or 3 rows×3 columns×3 channels, the devices can read DMA in three complete rows or part of rows of images along with the interleaved channels. So for a 640×480×3 image, the device is configured to read 640×3 rows×3 channels number of pixels. Such data can fit in L1 memory and can be processed in a single cycle or 0.5 cycle per multiplication. Doing a 3×3×3 convolution on this data provides 640 outputs for the rows in L1 memory. Also, since the device has all the columns for the rows present in L1, the device can process this data faster for all the rows. While this data is being processed in the foreground, 1 extra row of the input can be read in and can make use of the two rows that are repeated for the next operation. This makes memory transfer operations from L3 to L1 optimal. To enable this transfer, circular buffering is used so the three rows can be in any sequential order.

Another scheme that is disclosed is a non-interleaved scheme. The above interleaving scheme may work in a majority of cases. However, as the number of channels grows, it becomes increasingly more difficult to fit all the channels needed in L1 buffers. For example, if the data includes 20×15×512 layers for a 3×3×512 convolution, the device will need around 3 rows×512 channels×20 columns in the interleaved scheme (~20 KB), which may not be possible to fit in an L1 buffer, memory, or cache. In such cases, the disclosed non-interleaved scheme is provided.

For these layers, the device stores the data in a non-interleaved manner where one complete channel is read in at a time. For this example, the device will DMA in 20×15 pixels of 1 channel in and perform one channel of operations on this data. The intermediate output is stored and the next channel of 20×15 pixels is read in. This is added to the intermediate output from a previous channel, which ensures efficient use of the memory.

Another scheme that is disclosed is a 1×1 non-interleaved scheme. 1×1 convolutions are an important tool in reducing dimensionality of deep networks. They work by keeping the spatial dimensions (width and height) unchanged but increasing the depth of the layer. A typical scenario for operating on such data is with spatial dimensions being very small (for example, 20×15), but with large channels (for example, 512). Using the non-interleaved scheme for this data arrangement is usually inefficient since each channel of a 1×1 filter is only one element. So, the 1×1 non-interleaved scheme is provided to make this operation more efficient. In this scheme, the device reads in all the channels of as many spatial pixels as allowed by memory size and then performs the convolution operation on the channels read in.

The software architecture analyzes the memory available on the device and then chooses how many spatial pixels can fit in this memory and initializes the buffers and DMA descriptors accordingly.

The disclosed embodiments perform configuration based on the memory present in the chosen device. The disclosed embodiments choose which of the memory management schemes will suit the layers and generates a configuration that determines how each layer has to be processed. Since in some cases there may be a need to switch between interleaved formats and non-interleaved formats, the disclosed architecture also determines how the output of each layer has to be stored in the various levels of memory on the embedded device.

FIG. 1 is a block diagram of a system 100 for configuring a DNN to run on a resource constrained embedded device, in accordance with various embodiments. The system 100 includes a DNN information module 110, an embedded device information module 120, and a DNN processing scheme selection module 130.

The system 100 performs operations comprising: accessing DNN information including definition of layers and weights of the DNN; obtaining cache or memory information for one or more cache or memory levels of the resource constrained embedded device; configuring the DNN to be loaded onto the one or more cache or memory levels of the resource constrained embedded device based on the cache or memory information and the DNN information; selecting, based on the cache or memory information, between a plurality of DNN processing schemes for loading the DNN information and data onto the resource constrained embedded device, wherein a first of the plurality of DNN processing schemes causes a sub-portion of one of the layers interleaved with the weights and data to be loaded onto a single cache or memory level of the one or more cache or memory levels, and wherein a second of the plurality of DNN processing schemes causes a complete channel corresponding to the layers and the weights and data to be loaded onto the single cache or memory level; and selecting, based on the layers of the DNN, a convolution technique from a plurality of convolution techniques.

Specifically, the DNN information module 110 obtains weights and one or more layers of the DNN. The DNN information module 110 performs a statistical analysis of the range of weights per each layer. The DNN information module 110 determines an optimal quantization factor that preserves the most precision in 8 bit or 16 bit fixed point for the weights. For example, the weights may initially be received in floating point format and the DNN information module 110 converts the weights to fixed point format to reduce the storage requirements and improve the overall efficiency and speed at which the weights are processed. To optimize the conversion, the DNN information module 110 selects or computes a quantization factor that will result in the least amount of precision loss when converting from the floating point to the fixed point format.

An example of the DNN information module 110 choosing a quantization factor to preserve maximum efficiency for a 16 bit size will now be discussed. Specifically, the DNN information module 110 may determine that a given data set includes a particular weight range from +31.3 to −23.6. In such circumstances, the DNN information module 110 selects only 5 bits to represent the integers (as additional bits would be wasted given that 5 bits can represent a maximum value of 32), 1 bit for the sign (in the range −32 to +31), and the remaining 10 bits for the fractional part. This results in a quantization factor of Q5.10.

Conversely, the DNN information module 110 does not choose to have 8 bits for integers for a quantization factor of Q7.8 because doing so wastes 2 bits that would not be used to represent any point in the received data that is limited in values to a maximum of 32. Similarly, taking a quantization factor of Q.12 would ensure that there would be an insufficient number of integer bits to accurately depict the integer part. In some cases, the DNN information module 110 determines that there exists a weight range from +0.99 to −0.99. In such cases, the DNN information module 110 determines that there is no bit required for the integer part and can have a quantization factor of Q0.15 with 1 bit for sign and 15 bits for the fractional part. By not allocating any bits to representing the integer component of a data point, the DNN information module 110 ensures maximum precision in the weights is preserved. In this manner, the DNN information module 110 does an analysis on a range of inferencing and data points, finds out the maximum input and output range, their variances, average and then decides on the Q factor that can optimally represent the data set. In some cases, the DNN information module 110 allocates a Q8.8 format for input and output and Q1.15 for the weights and the scale factor. Namely, the weights can be quantized using one factor and the input/output data can be quantized using another factor.

In some embodiments, to make rounding optimal, the desired weight quantized format is 0.15 or Q 0.15 (e.g., the weights are quantized or represented by 16 bits). Any other suitable quantization format can be utilized in other implementations. In an example, the quantization format of 0.15 represents each weight without an integer bit and includes 1 bit representing the sign or polarity of the weight and the remaining 15 bits for the fractional portion of the weight. This choice is governed by the fact that, in some embedded devices, the system directly stores from the accumulator register to a register half and the number is automatically shifted by 16 bits. As such, having the weight format at Q.15 avoids shift operations after convolution and keeps the input and output to a convolution layer in the same Q format after convolution.

In some embodiments, the DNN information module 110 determines if the spread of values of weights enables the selection of a Q.15 format. If so, the DNN information module 110 adds a division factor to modify the existing weights to make the quantized format 0.15. For example, if the actual maximum weight is −3.9 and such a weight needs to be represented in the 0.15 format, the DNN information module 110 divides the weight by four to make it fully fractional (e.g., −3.9/4=−0.975). Namely, the DNN information module 110 searches all the weights of the DNN to identify those weights that include an integer component. If a weight includes an integer component, the DNN information module 110 factors out the integer component to enable the weight to be represented in the Q15 format where no bits are used to represent integers. Once the integer component is found for a given weight, the DNN information module 110 divides the weight by the value of the rounded up integer to remove the integer component. Namely, the DNN information module 110 rounds the weight up to the next highest integer and then divides the weight by the rounded up integer. At this point, the weight can be represented using only fractional bits. In some cases, making weights fully fractional makes the rounding operation more efficient on embedded processors or devices.

The DNN information module 110 stores, in association with each weight, the corresponding division factor as a correction factor in a configuration file that includes the adjusted weights and the layers of the DNN. This correction factor can be multiplied by the MAC output to recover the original weight value. For example, if the original weight was −3.9 and the correction factor is 4, the embedded processor obtains the correction factor after applying the fractional weight to the data to produce an output weighted data. The embedded processor then multiplies the result of the weighted data by the correction factor. Namely, the embedded processor accesses the configuration file and obtains the correction factor for the weight associated with a current layer of the DNN being processed. Based on the correction factor, after performing the fractional MAC operation on a given set of data for the current layer, the MAC or embedded processor multiplies the output of the MAC generated based on the fractional weight by the associated correction factor.

The DNN information module 110 compiles or generates a configuration file that represents the DNN (the weights and the layers) that includes the quantized weights and the associated correction factors. The DNN information module 110 computes a graph that defines the interconnections of layers and the types of layers (e.g., whether a layer is a convolution or a pooling layer). The DNN information module 110 associates the quantized weights with each layer. The DNN information module 110 receives the DNN architecture (the graph defining the layers) and the quantized weights as inputs and combines them in a defined format. The DNN information module 110 outputs the combination as a binary configuration file. In some cases, the DNN information module 110 encrypts the configuration file and adds various error correction codes (ECCs) (ECC or cyclic-redundancy-code (CRC)) to the configuration file. This maintains data integrity using CRC and other protection schemes.

The configuration file can be provided to an embedded device information module 120. The embedded device information module 120 can be included in the same device or system as the DNN information module 110 or can be included in an entirely different and separate hardware component or device. In some cases, the embedded device information module 120 obtains the configuration file and decrypts the configuration file and decodes the decrypted file using the associated ECC or CRC. This plain text configuration file can now be processed by the embedded device information module 120 to configure the DNN represented by the configuration file to operate on an embedded device.

As an example, the embedded device information module 120 receives an embedded device target information. For example, the embedded device information module 120 can receive user input that specifies the type of embedded device (including the type of processing units and MAC available on the device) and memory information associated with the embedded device (e.g., the size of the level 1 cache, the size of the level 2 cache, the size and availability of the level 3 cache, and/or various other memory components associated with the embedded device). In some cases, the embedded device information module 120 receives an identifier of the target processor on which the DNN associated with the configuration file will be run. The embedded device information module 120 accesses local or remote databases and searches the local or remote databases based on the identifier of the target processor to obtain the type of the embedded device and the memory information associated with the embedded device. The embedded device information module 120 provides the device type and memory information to the DNN processing scheme selection module 130.

The DNN processing scheme selection module 130 configures the DNN to run on the target embedded device by selecting between a plurality of DNN processing schemes. Specifically, the DNN processing scheme selection module 130 receives data to be processed by the embedded device and determines the layout of the data. Based on the DNN layers specified by the configuration file, the DNN processing scheme selection module 130 selects an efficient way to load the data and the DNN onto the embedded processor to apply the DNN to the data. In some cases, the DNN processing scheme selection module 130 selects the way in which to load the data so that as much data as possible can be included in the level 1 cache of the embedded device and processed by the DNN to reduce the latency associated with moving data between various memory levels.

In one example, the DNN processing scheme selection module 130 retrieves the data. The DNN processing scheme selection module 130 computes a first size corresponding to a first subset of rows and columns of the data across all of the layers. In response to determining that the first size fits within a level 1 cache of the embedded device, the DNN processing scheme selection module 130 selects the first of the plurality of DNN processing schemes (e.g., an interleaved scheme in which a sub-portion (less than all) of one of the layers is interleaved with the weights and data loaded onto a single cache or memory level of the one or more cache or memory levels) to process the first subset of the rows and columns across all of the layers. In this case, the DNN processing scheme selection module 130 causes a second subset of rows and columns of the data across all of the layers to be read into the level 1 cache while the first subset is being processed. The embedded device processes the second subset of the rows and columns based on an output of processing the first subset of the rows and columns. In some cases, the first and second subsets of the rows are stored in a circular buffer.

The DNN processing scheme selection module 130 determines that the first size exceeds a size of the level 1 cache and, in response, computes a second size corresponding to an entire row for a subset of columns of the data across a first layer of the layers. In response to determining that the second size fits within a level 1 cache of the resource constrained embedded device, the DNN processing scheme selection module 130 selects the second of the plurality of DNN processing schemes (e.g., a non-interleaved scheme in which a complete channel corresponding to the layers and the weights and data is loaded onto the single cache or memory level). In this case, the DNN processing scheme selection module 130 stores in the level 1 cache an intermediate output of processing the entire row for the subset of columns of the data across the first layer of the layers and causes the entire row for the subset of columns of the data across a second layer of the layers to be combined with the intermediate output.

The DNN processing scheme selection module 130 also selects the convolution technique to process the data (e.g., a convolution or a pooling operation) based on the given layer that is loaded onto the embedded device.

Figure 2:
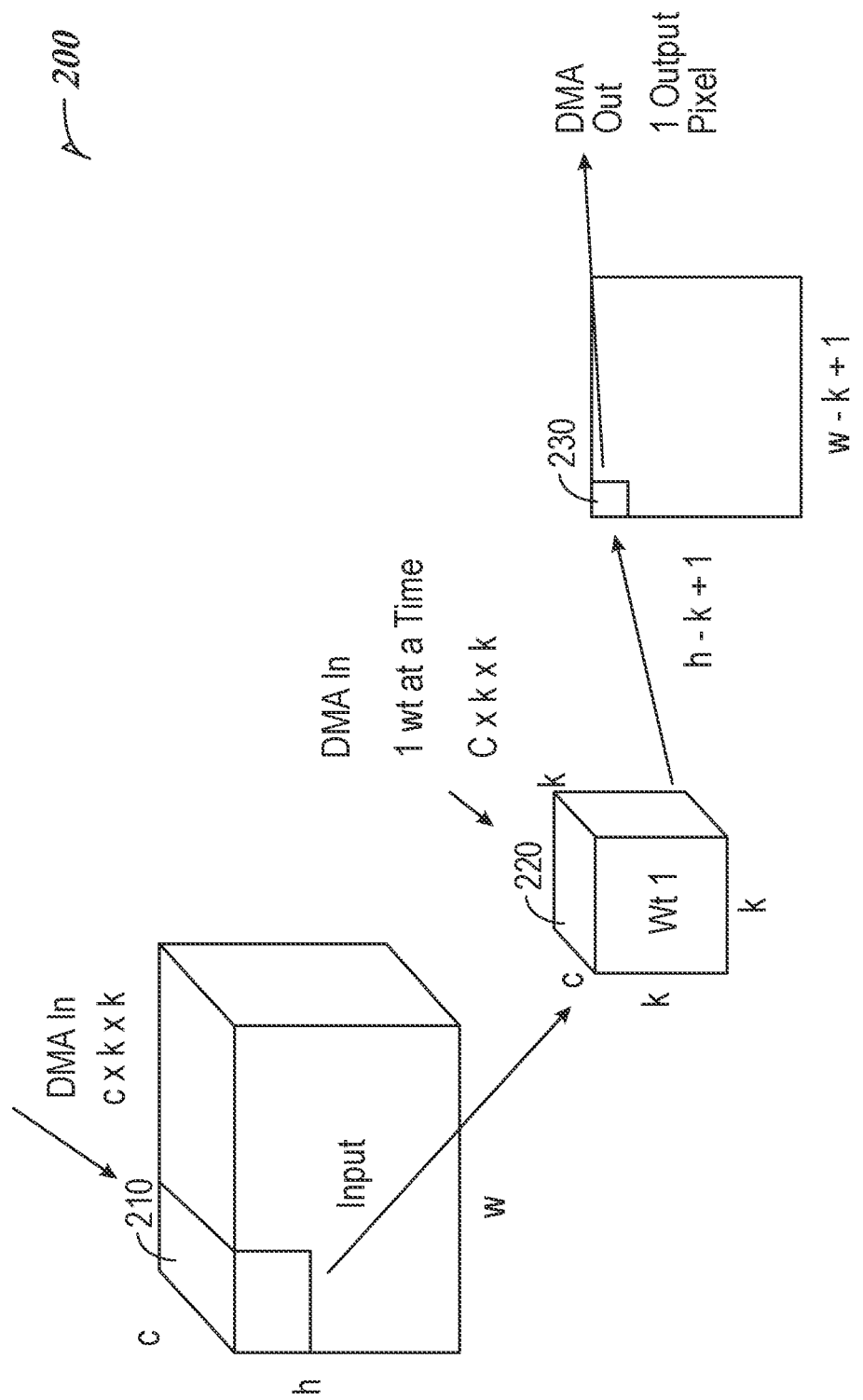
FIG. 2 is a block diagram of an interleaved processing scheme, in accordance with various embodiments.

FIG. 2 is a block diagram 200 of an interleaved processing scheme, in accordance with various embodiments. DNN processing scheme selection module 130 computes a size for a set of data 210 that includes a portion of rows and columns and for all of the channels (c). The size of the set of data 210 is determined to be smaller than the size of the level 1 cache of the embedded device. As such, the set of data 210 is provided and loaded with the weight associated with the layers of the DNN to generate a data object 220. The data object is processed by the embedded device to generate a single output pixel 230. While the single output pixel 230 is generated, the DNN processing scheme selection module 130 causes a second portion of the rows and columns for all of the channels to be loaded with the same weight using another data object. After the second portion is processed to generate another output pixel, the two pixels are combined.

Once the set of weights is combined with all the pixels in the input, the next set of weights can be loaded. The process is repeated with the next set of weights again with all the pixels of the input. For example, consider an input image of size 640×480×3. If a 3×3×3 convolution with 8 filters, for example, is performed on this input image, initially the $1^{st}$ channel of 8 filters of size 3×3×3 is loaded, which will be combined with the entire input of 640×480×3. Once this is done, the second set of filters out of 8 filters is loaded, which is again applied on the entire input of 640×480×3. This is repeated for all of the remaining of 8 filters.

For example, for an RGB image, the values are stored as R0, G0, B0, R1, G1, B1 . . . R640, G640, B640 (where R0 represents the red pixel value at the 0 position, R1 represents the red pixel value at the 1 position, and so forth; where G0 represents the green pixel value at the 0 position, G1 represents the green pixel value at the 1 position, and so forth; and where B0 represents the blue pixel value at the 0 position, B1 represents the blue pixel value at the 1 position, and so forth). For a 3×3×3 convolution or 3 rows×3 columns×3 channels, the embedded device can read in three complete rows or part of rows of images along with the interleaved channels. So for a 640×480×3 image, the embedded device is configured to read 640×3 rows×3 channels number of pixels as the data object 220. Such data can fit in L1 memory and can be processed in a single cycle or 0.5 cycle per multiplication. Doing a 3×3×3 convolution on this data provides 640 outputs for the rows in L1 memory. Also, since the embedded device has all the columns for the rows present in L1, the device can process this data faster for all the rows. While this data is being processed in the foreground and if stride is 1 (as is the most common use case), 1 extra row of the input can be read in and can make use of the two rows that are repeated for the next operation.

As an example, for the first iteration, rows 0, 1, and 2 of the image are processed with the 3×3 filter. Since this is interleaved, the total data that will be moved in can include 3 channels*3 rows*640 pixels in 1 row. For the second output row, if stride is 1 (as is usually common), rows 1, 2, and 3 are processed. Since rows 1 and 2 are already in memory, only the extra row 3 needs to be retrieved and loaded using DMA. So for this iteration, rows 1, 2, and 3 of the input image are processed and the data to be moved in will be 3 channels*1 row*640 pixels in 1 row. For the next output row, rows 2, 3, and 4 are needed and since rows 2 and 3 are already in memory, only the $4^{th}$ row needs to be retrieved and loaded into L1 memory.

Figure 3A:
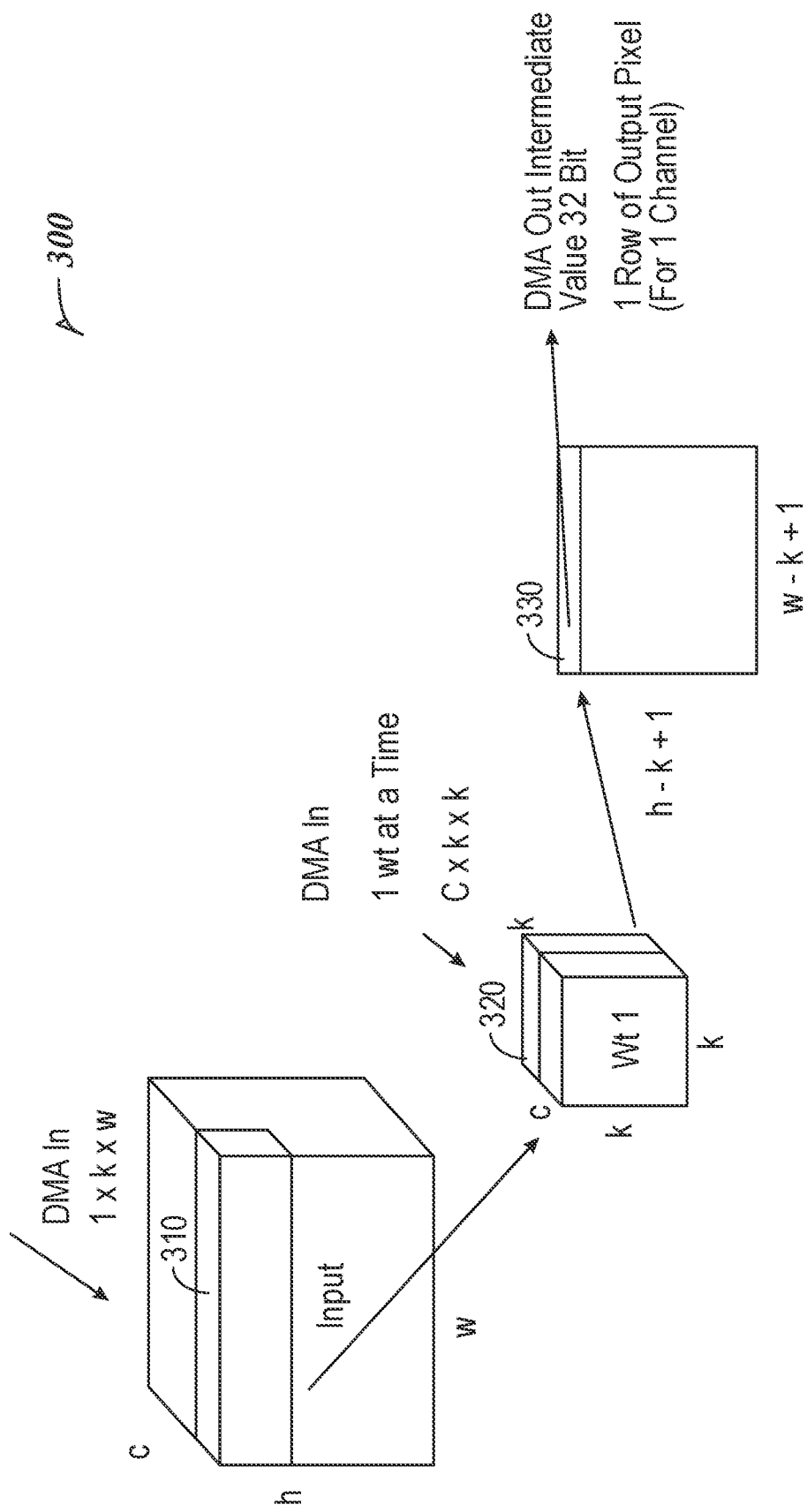
FIGS. 3A-C are block diagrams of a non-interleaved processing scheme, in accordance with various embodiments.
Figure 3B:
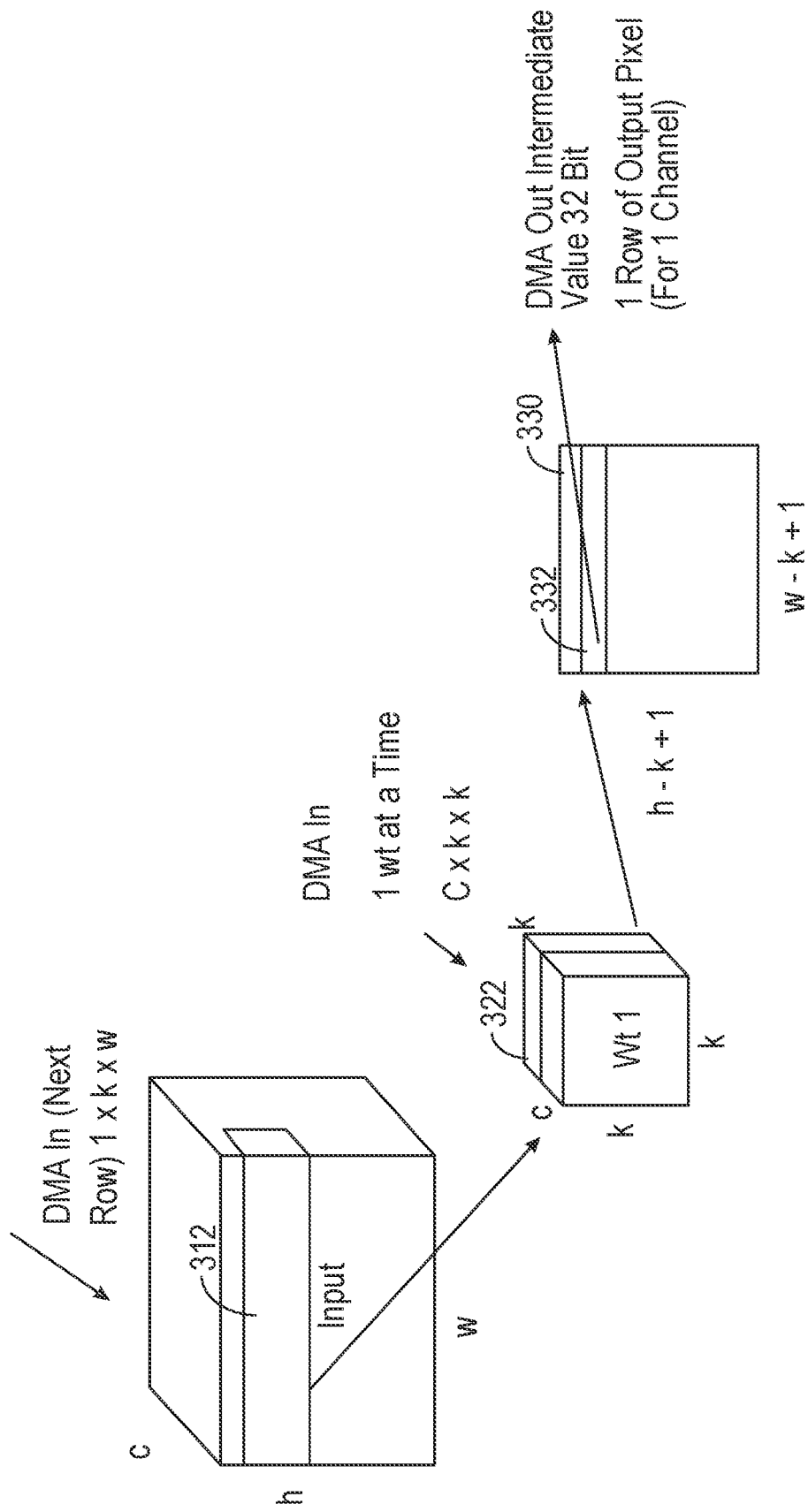
Figure 3C:
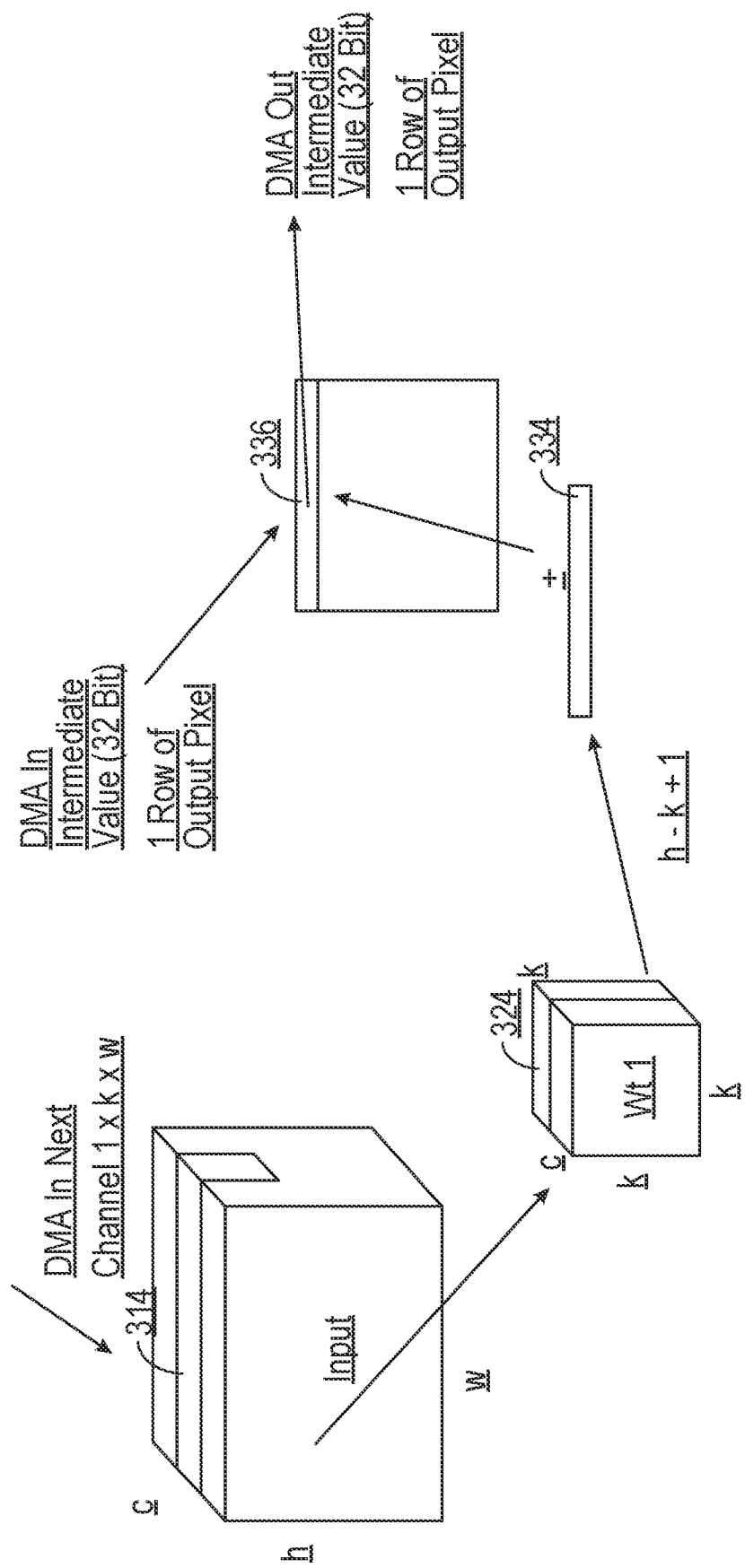

FIGS. 3A-C are block diagrams 300 of a non-interleaved processing scheme, in accordance with various embodiments. The DNN processing scheme selection module 130 computes a size of the data set 310 that includes a portion of the row and columns for a single channel of the input data. The DNN processing scheme selection module 130 can make this computation if the computation of the size resulting from a portion of the rows and columns across all of the channels is too large or exceeds the size of the level 1 cache of the embedded device. In this case, the DNN processing scheme selection module 130 determines that the size of the set 310 that includes a portion of the row and columns for a single channel is smaller than the size of the level 1 cache. In response, the DNN processing scheme selection module 130 obtains the portion of the row and columns for a single channel and generates a data object 320 that includes the weight associated with the layer of the DNN for the portion of the row and columns for the single channel.

The embedded device applies the convolution operation on the data object 320 to generate intermediate data 330 that includes an entire row of output pixels for a single channel. This intermediate data 330 is kept in the level 1 cache or level 2 cache of the embedded processor. As shown in FIG. 3B, in a subsequent iteration, a second set of data 312 that includes an adjacent portion of the row and columns for the same single channel of the input data is retrieved. In response, the DNN processing scheme selection module 130 obtains the second set of data 312 and generates a second data object 322 that includes the weight associated with the layer of the DNN for the portion of the row and columns for the single channel. The embedded device applies the convolution operation on the data object 322 to generate intermediate data 332 that includes another entire row of output pixels for the single channel. The embedded device combines the two intermediate data 330 and 332.

As shown in FIG. 3C, in a subsequent iteration, a third set of data 314 that includes an adjacent portion of the row and columns for a second single channel of the input data is retrieved. In response, the DNN processing scheme selection module 130 obtains the third set of data 314 and generates a third data object 324 that includes the weight associated with the layer of the DNN for the portion of the row and columns for the second single channel. The embedded device applies the convolution operation on the data object 322 to generate intermediate data 334 that includes another entire row of output pixels for the second single channel. The embedded device combines the intermediate data 334 with the previously combined two intermediate data 330 and 332 to generate a row of pixels 336.

For example, if the data includes a 20×15×512 layers for a 3×3×512 convolution, the device will need around 3 rows*512 channels*20 columns in the interleaved scheme (~20 KB), which may not be possible to fit in L1 buffer, memory, or cache. In such cases, the device stores the data in a non-interleaved manner where one complete channel is read in (or DMA) at a time. For this example, the device will read in 20×15 pixels of 1 channel and perform one channel of operations on this data. The intermediate output is stored and the next channel of 20×15 pixels is read in. This is added to the intermediate output from previous channel. This ensures efficient use of the memory.

In some cases, DNN processing scheme selection module 130 selects a 1×1 non-interleaved scheme, which keeps the spatial dimensions (width and height) unchanged but increases the depth of the layer. In this scheme, the device reads in all the channels of as many spatial pixels as allowed by memory and then performs the convolution operation on them. Specifically, similar to the interleaved scheme, the DNN processing scheme selection module 130 obtains a single row and a single column of pixels for all of the channels. If the size of this data object is smaller than the size of the level 1 cache, the DNN processing scheme selection module 130 then adds another row and another column to the data object for all of the channels. If the size of this data object is smaller than the size of the level 1 cache, the DNN processing scheme selection module 130 continues to add additional rows and columns to the data object for all of the channels until the size is larger than the level 1 cache. At this point, the DNN processing scheme selection module 130 removes the added rows and columns and uses the revised data object that includes a certain number of rows and columns for all the channels for loading into the level 1 cache with the weight of the layer.

Generally, it is seen that in DNN, as the number of layers increases, the spatial dimension reduces while the channel dimension grows. For example, if the initial layer is 640×480×3 for the first layer, this will go down to 20×15×1024 by the fifth layer. For the interleaved scheme, all the channels of the pixel are needed to get the output pixel. For a 3×3 convolution for the 1$^{st}$ row, all 3 channels are needed for each of the pixels along with 3 rows and 640 pixels in each row. This consumes an amount of a memory corresponding to 640×3×3=5760 pixels. For a 3×3 convolution for the fifth row, following the same method, 1024 channels×3 rows×20 rows per pixel are needed. This consumes an amount of a memory corresponding to 20×1024×3=61400 pixels. It can be seen that the dominant dimension is usually that of the channel dimension. As such, the DNN processing scheme selection module 130 lays out the memory in a non-interleaved manner, so all channels are laid out separately in a planar way. In that case, only 1 channel of the input image needs to be retrieved and loaded at a time. So, in the fifth row case, only 20×15 pixels need to be retrieved and loaded, which can include only 300 pixels. Correspondingly, the first channel of the 3×3 filter would be combined with this to generate the intermediate output. Then the next channel of 20×15 pixels from second filter out of 1024 filters would be loaded and combined with the second 3×3 filter and added to the previous intermediate output. This would be repeated for all 1024 channels to give the final output for one filter. The notable difference between the two interleaved schemes is in the way memory is laid out. In some cases, the memory is laid out and hence loaded as pixels of all input channels first and then spatial. In some cases, the input pixels are loaded into internal memory as spatial first, followed temporally by channels.

FIG. 4 is a flow diagram depicting example process 400 for configuring a DNN to run on a resource constrained embedded device. in accordance with various embodiments. The operations of the process 400 may be performed in parallel or in a different sequence, or may be entirely omitted. In some embodiments, some or all of the operations of the process 400 may be embodied on a computer-readable medium and executed by one or more processors.

At operation 410, the system 100 accesses DNN information including definition of layers and weights of the DNN.

At operation 420, the system 100 obtains cache or memory information for one or more cache or memory levels of the resource constrained embedded device.

At operation 430, the system 100 configures the DNN to be loaded onto the one or more cache or memory levels of the resource constrained embedded device based on the cache or memory information and the DNN information.

At operation 440, the system 100 selects, based on the cache or memory information, between a plurality of DNN processing schemes for loading the DNN information and data onto the resource constrained embedded device. A first of the plurality of DNN processing schemes causes a sub-portion of one of the layers interleaved with the weights and data to be loaded onto a single cache or memory level of the one or more cache or memory levels. A second of the plurality of DNN processing schemes causes a complete channel corresponding to the layers and the weights and data to be loaded onto the single cache or memory level.

At operation 450, the system 100 selects, based on the layers of the DNN, a convolution technique from a plurality of convolution techniques. For example, multiple types of convolution hardware devices (each implementing a different convolution technique, such as Transposed Convolution (Deconvolution, checkerboard artifacts), Dilated Convolution (Atrous Convolution), Separable Convolution (Spatially Separable Convolution, Depthwise Convolution), and/or Flattened Convolution) can be implemented on an embedded device. In such cases, the most efficient convolution technique is determined for processing the DNN layers and the associated one of the convolution hardware devices is instructed to process the DNN layers. In some cases, the embedded device may only implement a particular convolution technique on dedicated hardware devices and in such cases, the DNN is configured to be processed efficiently by the available convolution technique. In some cases, the embedded device may not include any dedicated circuitry for performing convolution operations. In such instances, the most efficient convolution technique implemented in software is selected to be performed by the embedded device to process the DNN layers.

Figure 5:
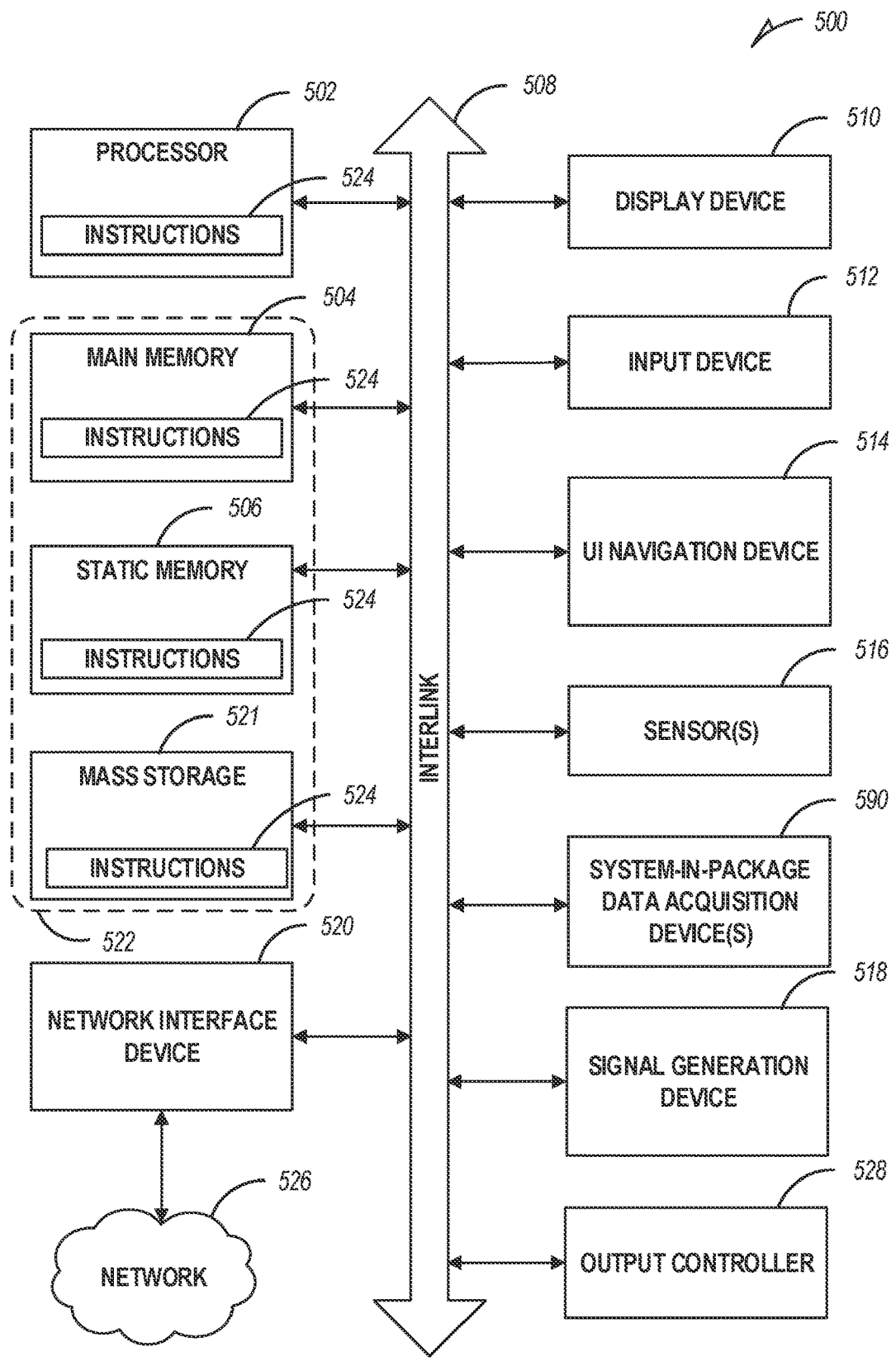
FIG. 5 is a block diagram illustrating an example of a machine upon which one or more embodiments may be implemented.

FIG. 5 is a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, an Internet of Things (IoT) device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 500 may include a hardware processor 502 (e.g., a central processing unit (CPU), a graphics processing unit (GPU), a hardware processor core, or any combination thereof, such as a memory controller, etc.), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, alphanumeric input device 512, and UI navigation device 514 may be a touchscreen display. The machine 500 may additionally include a storage device 522 (e.g., drive unit); a signal generation device 518 (e.g., a speaker); a network interface device 520; one or more sensors 516, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 590. The machine 500 may include an output controller 528, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 522 may include a machine-readable medium on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or a storage device may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 524.

The term "machine-readable medium" may include any transitory or non-transitory medium that is capable of storing, encoding, or carrying transitory or non-transitory instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data that are stored on the storage device 521 can be accessed by the main memory 504 for use by the hardware processor 502. The main memory 504 (e.g., DRAM) is typically fast, but volatile, and thus a different type of storage from the storage device 521 (e.g., an SSD), which is suitable for long-term storage, including while in an "off" condition. The instructions 524 or data in use by a user or the machine 500 are typically loaded in the main memory 504 for use by the hardware processor 502. When the main memory 504 is full, virtual space from the storage device 521 can be allocated to supplement the main memory 504; however, because the storage device 521 is typically slower than the main memory 504, and write speeds are typically at least twice as slow as read speeds, use of virtual memory can greatly reduce user experience due to storage device latency (in contrast to the main memory 504, e.g., DRAM). Further, use of the storage device 521 for virtual memory can greatly reduce the usable lifespan of the storage device 521.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 500, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended; that is, a system, device, article, composition, formulation, or process that includes elements in addition to those listed after such a term in a aspect are still deemed to fall within the scope of that aspect. Moreover, in the following aspects, the terms "first," "second," "third," etc. are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above detailed description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A method for configuring a deep neural network (DNN) to run on a resource constrained embedded device, the method comprising:

accessing DNN information including definition of layers and weights of the DNN;

obtaining cache or memory information for one or more cache or memory levels of the resource constrained embedded device;

configuring the DNN to be loaded onto the one or more cache or memory levels of the resource constrained embedded device based on the cache or memory information and the DNN information;

adjusting one or more weights of the DNN by a division factor;

storing, in a configuration file in association with each of the one or more weights, a correction factor corresponding to the division factor used to adjust the one or more weights of the DNN;

selecting, based on the cache or memory information, between a plurality of DNN processing schemes for loading the DNN information and data onto the resource constrained embedded device, wherein a first of the plurality of DNN processing schemes causes a sub-portion of one of the layers interleaved with the weights and data to be loaded onto a single cache or memory level of the one or more cache or memory levels, and wherein a second of the plurality of DNN processing schemes causes a complete channel corresponding to the layers and the weights and data to be loaded onto the single cache or memory level, wherein selecting the first of the plurality of DNN processing schemes comprises:

computing a first size corresponding to a first subset of rows and columns of the data across all of the layers;

determining that the first size fits within a level 1 cache of the resource constrained embedded device;

causing a second subset of rows and columns of the data across all of the layers to be read into the level 1 cache while the first subset is being processed; and processing the second subset of the rows and columns based on an output of processing the first subset of the rows and columns, wherein one extra row of a set of data is retrieved from a level 3 cache into the level 1 cache and makes use of two rows that are repeated for a next iteration;

selecting, based on the layers of the DNN, a convolution technique from a plurality of convolution techniques;

processing a given set of data based on the DNN by applying the adjusted one or more weights comprising one or more fractional weights to the given set of data to produce output weighted data;

retrieving the configuration file to obtain the correction factor corresponding to the division factor used to adjust the one or more weights of the DNN; and multiplying the output weighted data by the correction factor to recover a result corresponding to one or more original weight values of the DNN.

2. The method of claim 1, wherein the weights of the DNN are floating point weights, further comprising converting the floating point weights to variable length quantized fixed point weights based on a processing capability of the resource constrained embedded device, wherein the one or more weights of the DNN are quantized using one factor and the set of data is quantized using another factor.

3. The method of claim 2, further comprising:
computing a statistical metric of a range of the floating point weights; and
determining a quantization factor for converting the floating point weights to the variable quantized fixed point weights based on the statistical metric.

4. The method of claim 3, further comprising:
identifying a floating point weight that includes a fractional component and integer component; and
dividing the identified floating point weight by an integer to remove the integer component to improve rounding operations.

5. The method of claim 1, further comprising:
generating the configuration file that merges a layer and model graph structure of the DNN and the weights per each of the layers of the DNN; and
encrypting the configuration file.

6. The method of claim 5, wherein accessing the DNN information comprising obtaining the configuration file and decrypting the configuration file.

7. The method of claim 1, wherein the cache information comprises size information of a level 1 cache and level 2 cache of the resource constrained embedded device; and
wherein the memory information comprises a level 3 cache associated with the resource constrained embedded device.

8. The method of claim 1, wherein the first and second subsets of the rows are stored in a circular buffer.

9. The method of claim 1, further comprising:
in response to determining that the first size exceeds a size of the level 1 cache, computing a second size corresponding to an entire row for a subset of columns of the data across a first layer of the layers; and
in response to determining that the second size fits within a level 1 cache of the resource constrained embedded device, selecting the second of the plurality of DNN processing schemes.

10. The method of claim 1, further comprising:
storing in the level 1 cache an intermediate output of processing an entire row for the subset of columns of the data across the first layer of the layers; and
causing the entire row for the subset of columns of the data across a second layer of the layers to be combined with the intermediate output.

11. A system for configuring a deep neural network (DNN) to run on a resource constrained embedded device, the system comprising:
at least one processor configured to perform operations comprising:
accessing DNN information including definition of layers and weights of the DNN;
obtaining cache or memory information for one or more cache or memory levels of the resource constrained embedded device;
configuring the DNN to be loaded onto the one or more cache or memory levels of the resource constrained embedded device based on the cache or memory information and the DNN information;
adjusting one or more weights of the DNN by a division factor;
storing, in a configuration file in association with each of the one or more weights, a correction factor corresponding to the division factor used to adjust the one or more weights of the DNN;
selecting, based on the cache or memory information, between a plurality of DNN processing schemes for loading the DNN information and data onto the resource constrained embedded device, wherein a first of the plurality of DNN processing schemes causes a sub-portion of one of the layers interleaved with the weights and data to be loaded onto a single cache or memory level of the one or more cache or memory levels, and wherein a second of the plurality of DNN processing schemes causes a complete channel corresponding to the layers and the weights and data to be loaded onto the single cache or memory level, wherein selecting the first of the plurality of DNN processing schemes comprises:

computing a first size corresponding to a first subset of rows and columns of the data across all of the layers;

determining that the first size fits within a level 1 cache of the resource constrained embedded device;

causing a second subset of rows and columns of the data across all of the layers to be read into the level 1 cache while the first subset is being processed; and processing the second subset of the rows and columns based on an output of processing the first subset of the rows and columns, wherein one extra row of a set of data is retrieved from a level 3 cache into the level 1 cache and makes use of two rows that are repeated for a next iteration;

selecting, based on the layers of the DNN, a convolution technique from a plurality of convolution techniques;

processing a given set of data based on the DNN by applying the adjusted one or more weights comprising one or more fractional weights to the given set of data to produce output weighted data;

retrieving the configuration file to obtain the correction factor corresponding to the division factor used to adjust the one or more weights of the DNN; and multiplying the output weighted data by the correction factor to recover a result corresponding to one or more original weight values of the DNN.

12. The system of claim 11, wherein the weights of the DNN are floating point weights, further comprising converting the floating point weights to quantized fixed point weights based on a processing capability of the resource constrained embedded device.

13. The system of claim 12, wherein the operations further comprise:
computing a statistical metric of a range of the floating point weights; and
determining a quantization factor for converting the floating point weights to the quantized fixed point weights based on the statistical metric.

14. The system of claim 13, wherein the operations further comprise:
identifying a floating point weight that includes a fractional component and integer component; and
dividing the identified floating point weight by an integer to remove the integer component to improve rounding operations.

15. A non-transitory computer readable medium storing non-transitory computer readable instructions to configure one or more processors to perform operations for configuring a deep neural network (DNN) to run on a resource constrained embedded device, the operations comprising:
accessing DNN information including definition of layers and weights of the DNN;
obtaining cache or memory information for one or more cache or memory levels of the resource constrained embedded device;
configuring the DNN to be loaded onto the one or more cache or memory levels of the resource constrained embedded device based on the cache or memory information and the DNN information;
adjusting one or more weights of the DNN by a division factor;
storing, in a configuration file in association with each of the one or more weights, a correction factor corresponding to the division factor used to adjust the one or more weights of the DNN;
selecting, based on the cache or memory information, between a plurality of DNN processing schemes for loading the DNN information and data onto the resource constrained embedded device, wherein a first of the plurality of DNN processing schemes causes a sub-portion of one of the layers interleaved with the weights and data to be loaded onto a single cache or memory level of the one or more cache or memory levels, and wherein a second of the plurality of DNN processing schemes causes a complete channel corresponding to the layers and the weights and data to be loaded onto the single cache or memory level, wherein selecting the first of the plurality of DNN processing schemes comprises:
computing a first size corresponding to a first subset of rows and columns of the data across all of the layers;
determining that the first size fits within a level 1 cache of the resource constrained embedded device;
causing a second subset of rows and columns of the data across all of the layers to be read into the level 1 cache while the first subset is being processed; and
processing the second subset of the rows and columns based on an output of processing the first subset of the rows and columns, wherein one extra row of a set of data is retrieved from a level 3 cache into the level 1 cache and makes use of two rows that are repeated for a next iteration;
selecting, based on the layers of the DNN, a convolution technique from a plurality of convolution techniques;
processing a given set of data based on the DNN by applying the adjusted one or more weights comprising one or more fractional weights to the given set of data to produce output weighted data;
retrieving the configuration file to obtain the correction factor corresponding to the division factor used to adjust the one or more weights of the DNN; and
multiplying the output weighted data by the correction factor to recover a result corresponding to one or more original weight values of the DNN.

16. The non-transitory computer readable medium of claim 15, wherein the weights of the DNN are floating point weights, further comprising converting the floating point weights to quantized fixed point weights based on a processing capability of the resource constrained embedded device.

17. The non-transitory computer readable medium of claim 16, wherein the operations further comprise:
computing a statistical metric of a range of the floating point weights; and
determining a quantization factor for converting the floating point weights to the quantized fixed point weights based on the statistical metric.

18. The non-transitory computer readable medium of claim 17, wherein the operations further comprise:
identifying a floating point weight that includes a fractional component and integer component; and
dividing the identified floating point weight by an integer to remove the integer component to improve rounding operations.

* * * * *